United States Patent

Yamaguchi et al.

Patent Number: 5,496,165
Date of Patent: Mar. 5, 1996

[54] SHAPING CUTTER

[75] Inventors: Mitsuo Yamaguchi; Yuji Shimamoto, both of Sakado, Japan

[73] Assignee: Meiji Seika Kaisha, Ltd., Tokyo, Japan

[21] Appl. No.: 363,876

[22] Filed: Dec. 27, 1994

[30] Foreign Application Priority Data

Dec. 27, 1993 [JP] Japan ............... 5-069872 U

[51] Int. Cl.$^6$ ............... A21C 11/10
[52] U.S. Cl. ............... 425/289; 425/312; 426/503; 426/518; 83/318; 83/326; 83/560; 83/932
[58] Field of Search ............... 425/312, 289, 425/308, 296; 426/503, 518; 83/932, 935, 318, 320, 560, 326

[56] References Cited

U.S. PATENT DOCUMENTS

| | | | |
|---|---|---|---|
| 4,767,304 | 8/1988 | Tashiro | 426/518 |
| 5,158,792 | 10/1992 | Morikawa et al. | 426/503 |

FOREIGN PATENT DOCUMENTS

| | | | |
|---|---|---|---|
| 139309 | 8/1901 | Germany | 425/289 |
| 45-22995 | 8/1970 | Japan | 83/318 |

*Primary Examiner*—Khanh P. Nguyen
*Attorney, Agent, or Firm*—Nikaido, Marmelstein, Murray & Oram

[57] ABSTRACT

Disclosed is a shaping cutter including upper and lower blades (4) and (3) fastened at one end so as to open in the shape of the letter X and cut when they close. The upper blade has an operating lever (6) extending from the end at which the upper and lower blades are fastened. An endless linear conveyor (2) has the lower blades fixed thereon, and a guide rod (7) extends parallel to the conveyor. When the conveyor moves, the operating levers of the upper blades slide along the guide rod to cause the upper blades to move from the opening position to the closing position relative to the lower blades, thereby cutting into pieces an elongated edible dough running at the same speed in the same direction as the endless linear conveyor runs. The elongated edible dough can be cut into pieces of a desired shape and size in succession. Advantageously a variety of funny-shaped pieces of confectionery or food can be provided by selecting appropriate blade shapes.

2 Claims, 3 Drawing Sheets

SHAPING CUTTER

BACKGROUND OF THE INVENTION

1. Field of the Invention

The present invention relates to a shaping cutter for cutting into pieces elongated edible dough whose cross section is round, square, triangular or of any other shape, extruded from an apparatus for producing edible dough for confectionery or other foodstuff, particularly to such a shaping cutter which is capable of cutting elongated edible dough into pieces of funny shapes.

2. Description of Related Art

When cutting elongated edible dough for confectionery or other foodstuff into pieces, a high-speed rotary blade is used to cut such elongated edible dough into pieces immediately after they are extruded from an extruder, or a "guillotine"-like cutter is used to cut such elongated edible dough into pieces after being dried and somewhat hardened.

The high-speed rotary blade is difficult to cut elongated edible dough into pieces of exact length. The "guillotine"-like cutter has the same difficulty as the high-speed rotary blade, and still disadvantageously it can provide no clear-cut pieces, and is liable to increase rejected or broken pieces.

A spherical cutter is widely used in cutting and shaping candies, but it is not appropriate for cutting and shaping snack confectionery dough such as extruded from the extruder; it cannot provide such dough pieces of same shape and size continuously.

SUMMARY OF THE INVENTION

One object of the present invention is to provide a shaping cutter which is capable of cutting elongated edible dough into pieces of same size and shape continuously.

Another object of the present invention is to provide a shaping cutter which is capable of providing sharp-cut pieces of desired size and shape, guaranteed to be free of rejected or broken pieces.

To attain these objects of the present invention a shaping cutter comprising: upper and lower blades fastened at one end so as to open in the shape of the letter X and cut when they close, said upper blade having an operating lever extending from the end at which said upper and lower blades are fastened; an endless linear conveyor on which said lower blades are fixed; and a guide rod on which the operating levers of said upper blades slide to cause said upper blades to move from the opening position to the closing position relative to said lower blades while said endless linear conveyor runs to carry said lower blades, thereby cutting into pieces an elongated edible dough running at the same speed in the same direction as said endless linear conveyor runs.

The endless linear conveyor may be an endless belt conveyor or an endless chain conveyor.

Other objects and advantages of the present invention will be understood from the following description of a shaping cutter according to one preferred embodiment of the present invention.

BRIEF DESCRIPTION OF THE DRAWINGS

FIG. 7 is a side view of the upper and lower blades having linear edges, and end and perspective views of one sharp-cut piece, showing how the sharp-cut ends of the piece is like;

FIG. 8 is a side view of the upper and lower blades having 90-degree triangular edges, and end and perspective views of one sharp-cut piece, showing how the sharp-cut ends of such piece is like; and FIG. 9 is a side view of the upper and lower blades having 60-degree triangular edges, and end and perspective views of one sharp-cut piece, showing how the sharp-cut ends of such piece is like.

DESCRIPTION OF THE PREFERRED EMBODIMENTS

Figure 1:
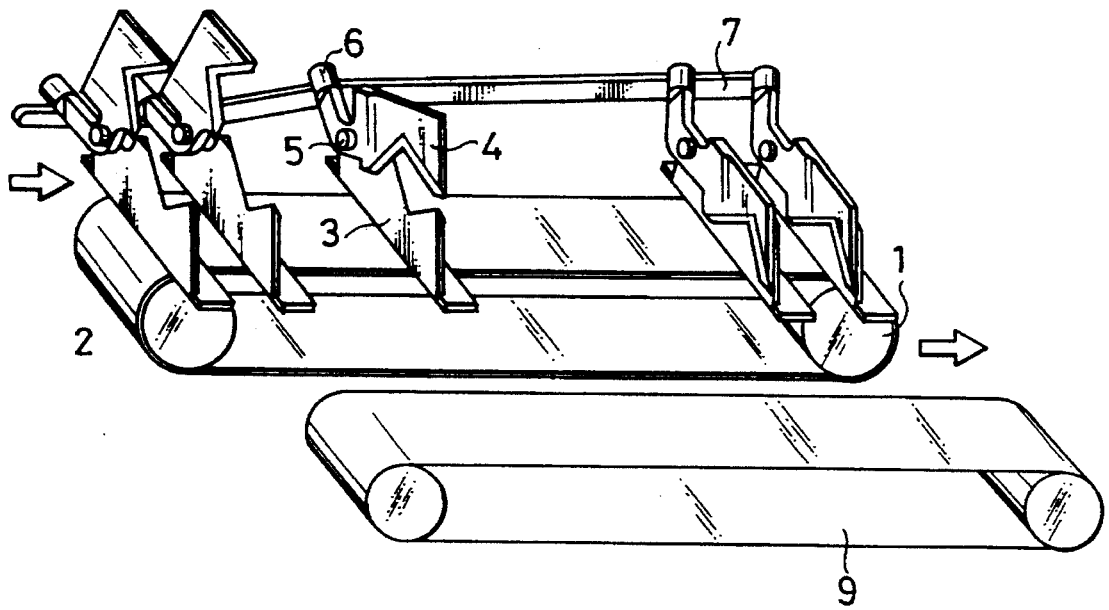
FIG. 1 is a perspective view of a shaping cutter according to one preferred embodiment.

Referring to FIG. 1, a shaping cutter includes upper and lower blades 3 and 4 fastened at one end so as to open in the shape of the letter X and cut when they close. The upper blade 4 has an operating lever 6 extending from the pivot end 5 at which the upper and lower blades 3 and 4 are fastened.

An endless belt conveyor comprises an endless belt 2 and opposite rolls 1. The endless belt 2 has the lower blades fixed thereon. An inclined guide rod 7 extends parallel to one side of the conveyor, and the operating levers 6 of the upper blades 4 slide therealong to cause the upper blades 4 to move from the opening position to the closing position relative to the lower blades 3 while the conveyor runs to carry the lower blades 3, thereby cutting into pieces an elongated confectionery dough running at the same speed in the same direction as the endless belt conveyor runs. Another endless belt conveyor 9 is laid below the endless belt 2 to carry pieces failing from the overlying endless belt 2.

In operation, the endless belt conveyor is put in motion to carry the upper and lower blades 3 and 4 forward, and the operating levers 6 of the upper blades 4 slide on the inclined guide rod 7, climbing the slope of the guide rod 7 to cause the upper cutters 4 to rotate about the pivot ends 5 until the upper and lower blades 4 and 3 close.

An elongated confectionery dough must be fed to the shaping cutter in the direction as indicated by arrow at the same speed as the endless belt conveyor.

Figure 2:
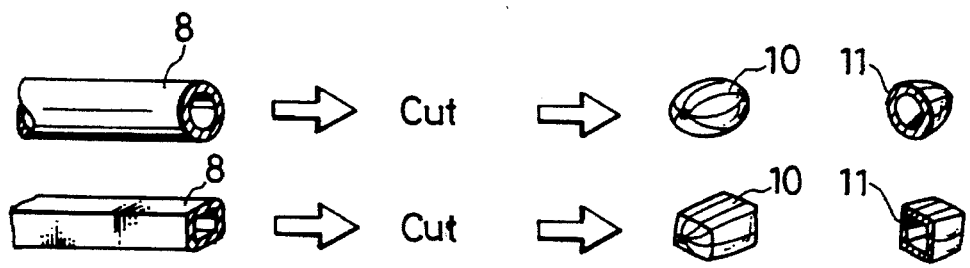
FIG. 2 shows hollow elongated confectionery dough and sharp-cut pieces.

Referring to FIG. 2, after round, rectangular or triangular elongated confectionery dough 8 is extruded from the extruder, and while these elongated confectionery dough 8 remains wet, soft and sticky, they are gradually pinched between the upper and lower blades when these blades closing, and finally the hollow tube-like dough is cut into pieces 10 as shown in the drawing. These pieces have sections 11.

Figure 3:
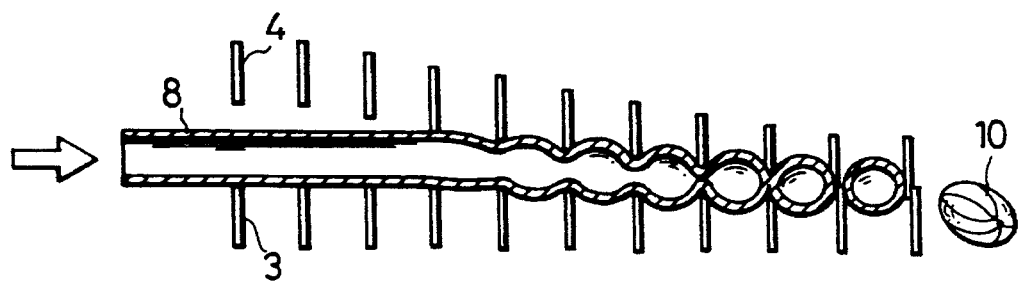
FIG. 3 shows how a hollow elongated confectionery dough is pinched gradually between the upper and lower blades.

Referring to FIG. 3, a hollow elongated confectionery dough 8 is pinched gradually between the upper and lower blades 4 and 3, and finally a piece is cut and separated from the remaining hollow elongated confectionery dough 8. The piece has pinched ends, and it can remain hollow or can have cream or chocolate filled therein.

The shape of each pinched end depends on the edge shape of the cutter blade, and therefore, a desired pinched end shape can be given by using a blade having an appropriate edge shape.

It should be noted that the blade edge is not sharp, and that it is preferably flat, ordinarily 0.5 to 1.0 mm thick, selectable in consideration of the condition of confectionery dough.

Figure 4:
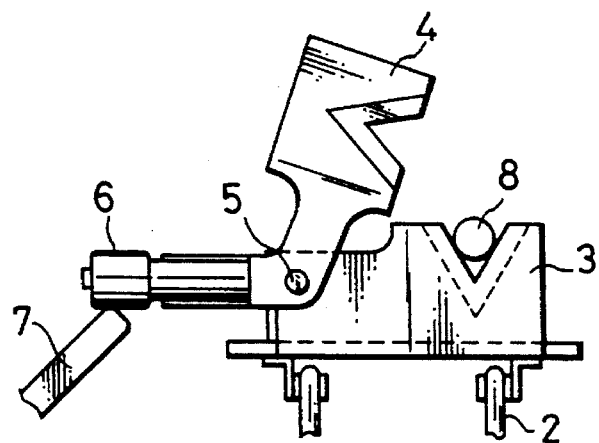
FIG. 4 is a side view of the upper and lower blades with an elongated confectionery dough resting on the lower blade.
Figure 5:
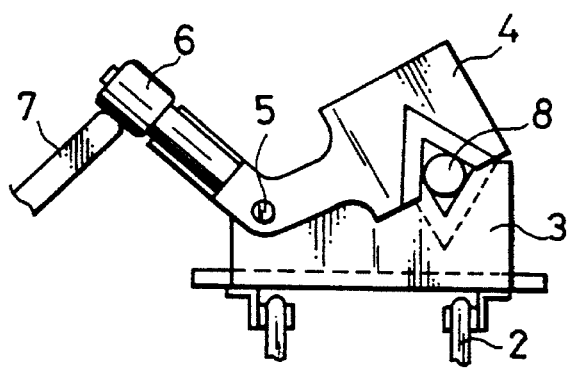
FIG. 5 is a similar side view, but showing that the elongated confectionery dough is pinched between the upper and lower blades.
Figure 6:
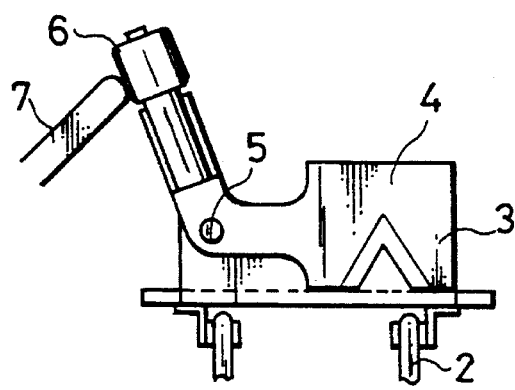
FIG. 6 is a similar side view, but showing that the elongated confectionery dough is cut.

Referring to FIGS. 4 and 5, the upper blade 4 moves toward the lower blade 3 as the hollow elongated confectionery dough 8 moves along with the lower blade 3, and finally it is cut when the upper and lower blades 4 and 3 close as shown in FIG. 6.

Figure 7:
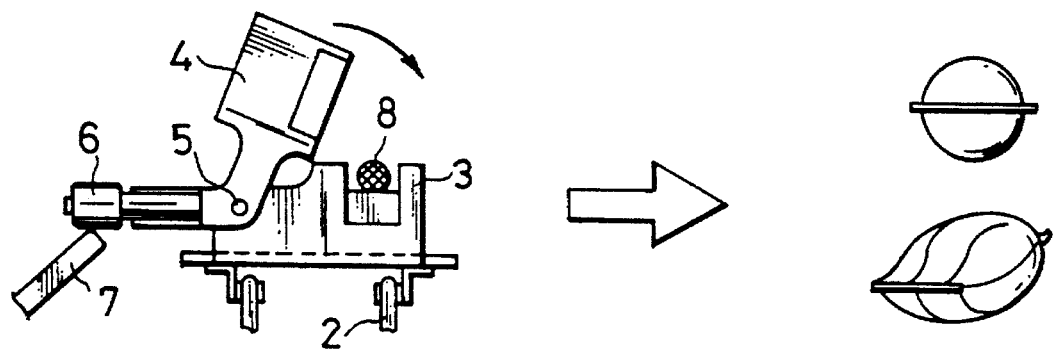
Figure 8:
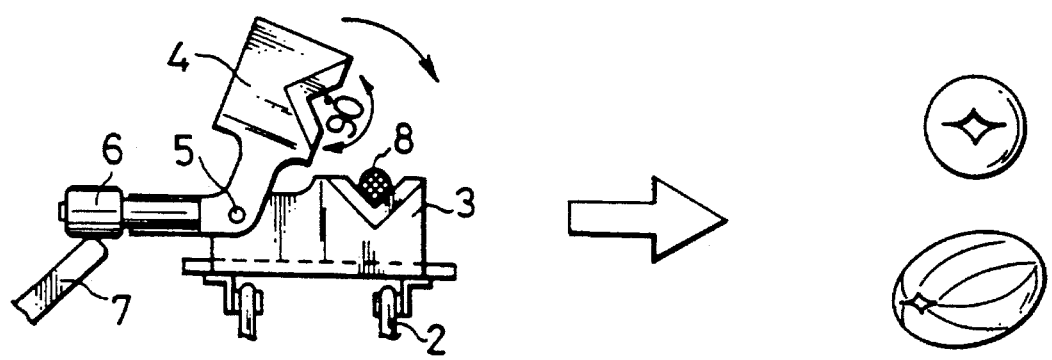
Figure 9:
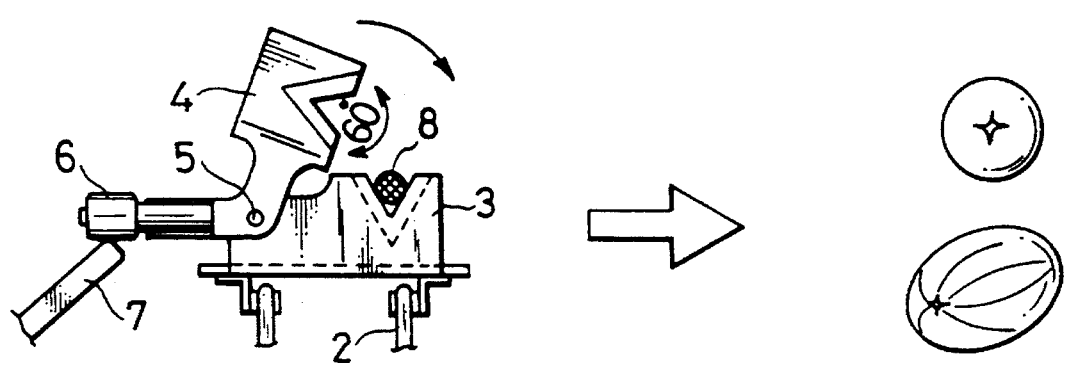

Referring to FIGS. 7, 8 and 9, three different shapes of sharp-cut pieces are shown in connection with cutter blades: a piece having sharp-cut and closed ends (FIG. 7); a piece having sharp-cut and somewhat large-open ends (FIG. 8) and a piece having sharp-cut and somewhat small-open ends (FIG. 9).

As described above, a shaping cutter according to the present invention provides the following advantages:

(1) elongated edible dough which is extruded from an extruder in preparing edible dough for confectionery or other foodstuff can be cut into pieces of a desired shape and size in succession, reducing the number of rejected pieces of confectionery or food; and (2) a variety of funny-shaped pieces of confectionery or other foodstuff including open-ended, hollow or solid pieces can be provided by selecting appropriate blades.

We claim:

1. A shaping cutter comprising: upper and lower blades fastened at one end so as to open in the shape of the letter X and cut when they close, said upper blade having an operating lever extending from the end at which said upper and lower blades are fastened; an endless linear conveyor on which said lower blades are fixed; and a guide rod on which the operating levers of said upper blades slide to cause said upper blades to move from the opening position to-the closing position relative to said lower blades while said endless linear conveyor runs to carry said lower blades, thereby cutting into pieces an elongated edible dough running at the same speed in the same direction as said endless linear conveyor runs.

2. A shaping cutter according to claim 1 wherein said endless linear conveyor is an endless belt conveyor or an endless chain conveyor.

* * * * *